(12) United States Patent
Matsuda et al.

(10) Patent No.: US 8,827,023 B2
(45) Date of Patent: Sep. 9, 2014

(54) HYBRID VEHICLE

(71) Applicant: Fuji Jukogyo Kabushiki Kaisha, Tokyo (JP)

(72) Inventors: Hiroshi Matsuda, Tokyo (JP); Toshiaki Naruke, Tokyo (JP); Minoru Iida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/778,641

(22) Filed: Feb. 27, 2013

(65) Prior Publication Data
US 2013/0248268 A1    Sep. 26, 2013

(30) Foreign Application Priority Data

Mar. 22, 2012  (JP) .................................. 2012-065094

(51) Int. Cl.
*B60R 16/04*    (2006.01)
(52) U.S. Cl.
USPC .......................................................... 180/68.5
(58) Field of Classification Search
USPC .................... 180/68.5, 65.21, 65.29
See application file for complete search history.

(56) References Cited

U.S. PATENT DOCUMENTS

| | | | | |
|---|---|---|---|---|
| 6,963,186 | B2 * | 11/2005 | Hobbs | 320/128 |
| 7,411,371 | B2 * | 8/2008 | Hobbs | 320/128 |
| 8,006,793 | B2 * | 8/2011 | Heichal et al. | 180/68.5 |
| 8,011,467 | B2 * | 9/2011 | Asao et al. | 180/68.5 |
| 8,397,853 | B2 * | 3/2013 | Stefani et al. | 180/68.5 |
| 8,517,132 | B2 * | 8/2013 | Heichal et al. | 180/68.5 |
| 8,561,743 | B2 * | 10/2013 | Iwasa et al. | 180/68.5 |
| 2008/0000703 | A1 * | 1/2008 | Shindou | 180/68.5 |

FOREIGN PATENT DOCUMENTS

| | | |
|---|---|---|
| JP | 2000-247261 | 9/2000 |
| JP | 2010-155570 | 7/2010 |

\* cited by examiner

*Primary Examiner* — Hau Phan
(74) *Attorney, Agent, or Firm* — Smith, Gmabrell & Russell, LLP.

(57) ABSTRACT

There is provided a hybrid vehicle. The hybrid vehicle including: a propeller shaft that transmits a driving force in the front-rear direction of the vehicle body; and a battery unit that is disposed below the propeller shaft under the floor of the vehicle body so that the battery unit is detachable from the vehicle body when the propeller shaft is pushed down.

7 Claims, 4 Drawing Sheets

HYBRID VEHICLE

CROSS-REFERENCE TO RELATED APPLICATIONS

The present application claims priority from Japanese Patent Application No. 2012-065094 filed on Mar. 22, 2012, the entire contents of which are hereby incorporated by reference.

BACKGROUND OF THE INVENTION

1. Field of the Invention

The present invention relates to a hybrid vehicle such as a hybrid automobile, the hybrid vehicle having a propeller shaft to transmit a driving force in the front-rear direction of the vehicle body. In particular, the present invention relates to a mounting structure of a battery unit for a hybrid vehicle.

2. Description of the Related Art

Some vehicles such as an automobile have a propeller shaft. Those vehicles include, for example, automobiles that use an FR (Front engine Rear drive) or AWD (All-Wheel Drive) drive system. The propeller shaft is disposed under the floor of a vehicle body to transmit a driving force in the front-rear direction of the vehicle body, the driving force being generated by an engine or the like.

A vehicle having such a propeller shaft may be converted to an electric vehicle or a hybrid vehicle. An electric vehicle and a hybrid vehicle need to be provided with a battery unit with a large capacity. Mounting a battery unit reduces the cargo space in the rear of the backseat and makes it difficult to maintain proper weight balance in the vehicle longitudinal direction. In Japanese Unexamined Patent Application Publication No. 2000-247261, part of the dead space is effectively used for the battery unit, whereby a battery unit does not have to be mounted in the cabin space. In this case, specifically, the propeller shaft and the battery unit are disposed under the floor of the vehicle body. The battery unit needs to be replaced for every predetermined period. Therefore, the battery unit is preferably disposed below the propeller shaft so as to be able to be replaced without any contact with the propeller shaft.

However, when the battery unit is disposed below the propeller shaft, the impact absorption performance of the vehicle upon a collision, for example, may be adversely affected. When the battery unit is disposed below the propeller shaft, the engine of the vehicle may be pushed back upon a collision and the propeller shaft may be bent. Accordingly, the bent propeller shaft comes into contact with the battery unit. The magnitude of the bend angle of the propeller shaft is limited by the presence of the battery unit. This imposes a limit on the magnitude of backward push to the engine, and thus the impact absorption performance in relation to the backward push is reduced.

Thus, a vehicle having a propeller shaft preferably has a member capable of controlling bending of the propeller shaft, so that the adverse effect to the impact absorption performance is reduced. It is desirable that the battery unit disposed under the floor should be provided with a function of such control.

SUMMARY OF THE INVENTION

The present invention has been designed in consideration of the circumstances described above, and an object thereof is to provide a hybrid vehicle.

An aspect of the present invention provides a hybrid vehicle including a propeller shaft to transmit a driving force in a front-rear direction of the vehicle body, and a battery unit that is disposed below the propeller shaft under a floor of the vehicle body and is configured to be detachable from the vehicle body when the propeller shaft is pushed down.

Thus, for example, in the case where the engine is pushed back and the propeller shaft is bent and pushed down, the battery unit is partially detached from the vehicle body. Because the battery unit is partially detached, the magnitude of the bend angle of the propeller shaft is not limited by the presence of the battery unit, thereby reducing the adverse effect to the impact absorption performance caused by the disposition of the battery unit below the floor.

Preferably, the battery unit includes a housing that has a pair of side sections disposed on left and right sides of the propeller shaft under the floor of the vehicle body and is configured to house a battery, and a central section configured to connect the pair of side sections below the propeller shaft. The propeller shaft is housed in a space that is enclosed by the pair of side sections and the central section of the housing, and the floor of the vehicle body.

Preferably, the battery unit is detachably mounted to the floor of the vehicle body, so that the battery unit is partially detached from the vehicle body by the housing being pushed down by the propeller shaft which has been pushed down.

Preferably, the battery unit is mounted to the floor of the vehicle body with a plurality of mounting members disposed at front and rear positions of the vehicle body. Connection between the battery unit and the hybrid vehicle via the front mounting members are released by the housing being pushed down by the propeller shaft which has been pushed down.

Preferably, the hybrid vehicle further includes a retaining member configured to connect the housing of the battery unit to the vehicle body. The retaining member is configured to retain the housing which has been detached at the front position due to the release of the connection between the battery unit and the hybrid vehicle via the front mounting members.

Preferably, a power cable that connects the battery unit to the vehicle body is configured to electrically separate the detached battery unit from the vehicle body with a structure of a detachable plug and a receptacle.

Preferably, the propeller shaft is connected to an engine disposed at a front position of the vehicle body and has a coupling or a bearing at a location rearward of the front mounting members. When the engine is pushed back, the propeller shaft is bent at the coupling or the bearing, and the housing is pushed down, thereby causing the battery unit to be detached at the front location.

DESCRIPTION OF THE PREFERRED EMBODIMENTS

Hereinafter, a hybrid vehicle according to an embodiment of the present invention will be described with reference to the accompanying drawings. A hybrid vehicle is described as an example.

Figure 1:
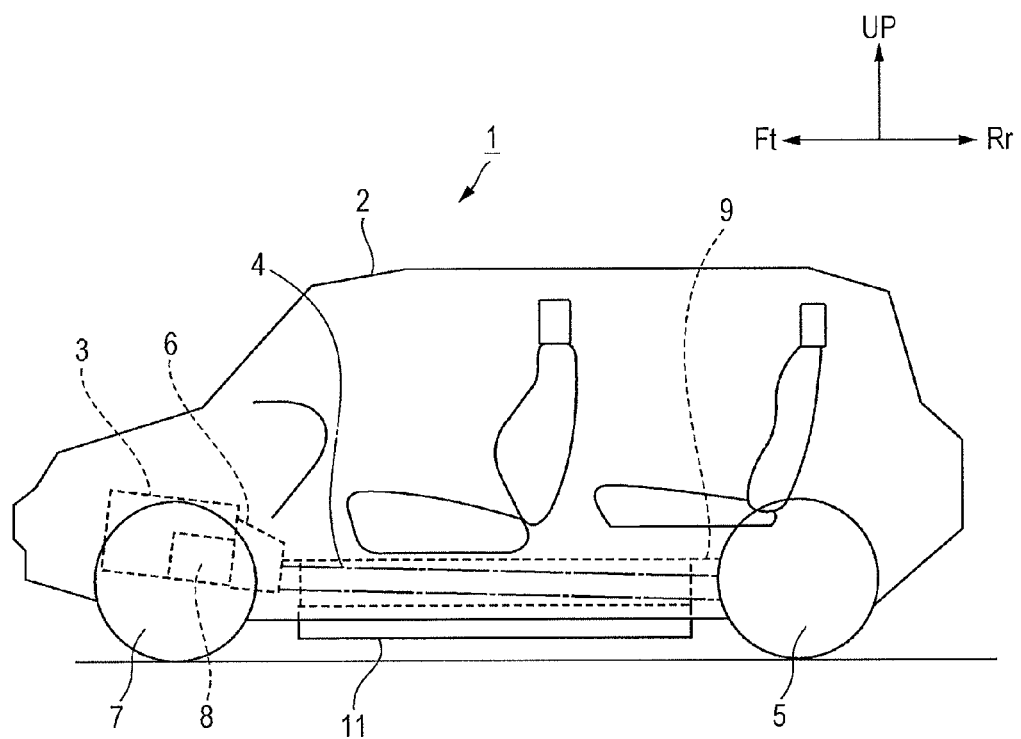
FIG. 1 is a schematic side view of a hybrid vehicle having a battery unit according to an embodiment of the present invention.
Figure 2:
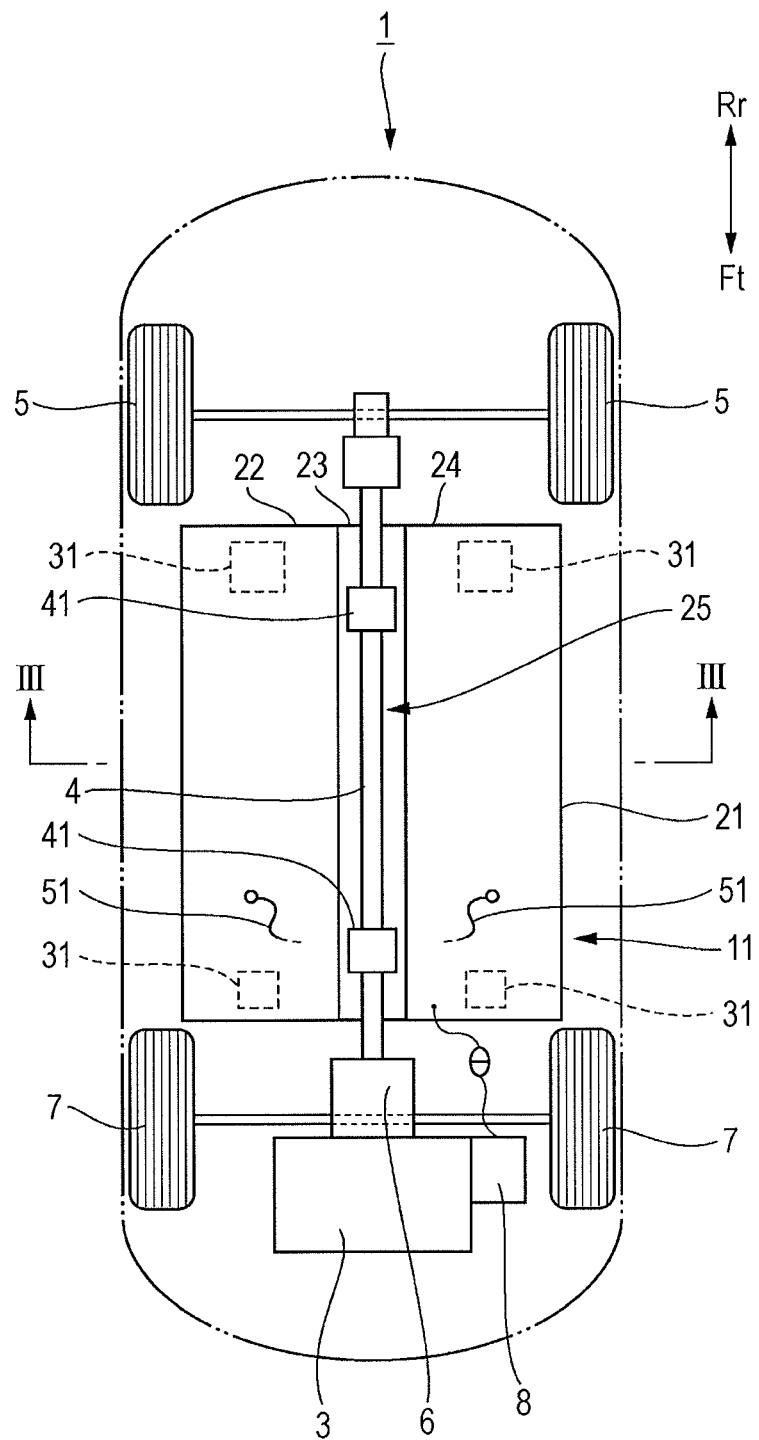
FIG. 2 is a top view illustrating a structure for mounting the battery unit of the hybrid vehicle of FIG. 1.
Figure 3:
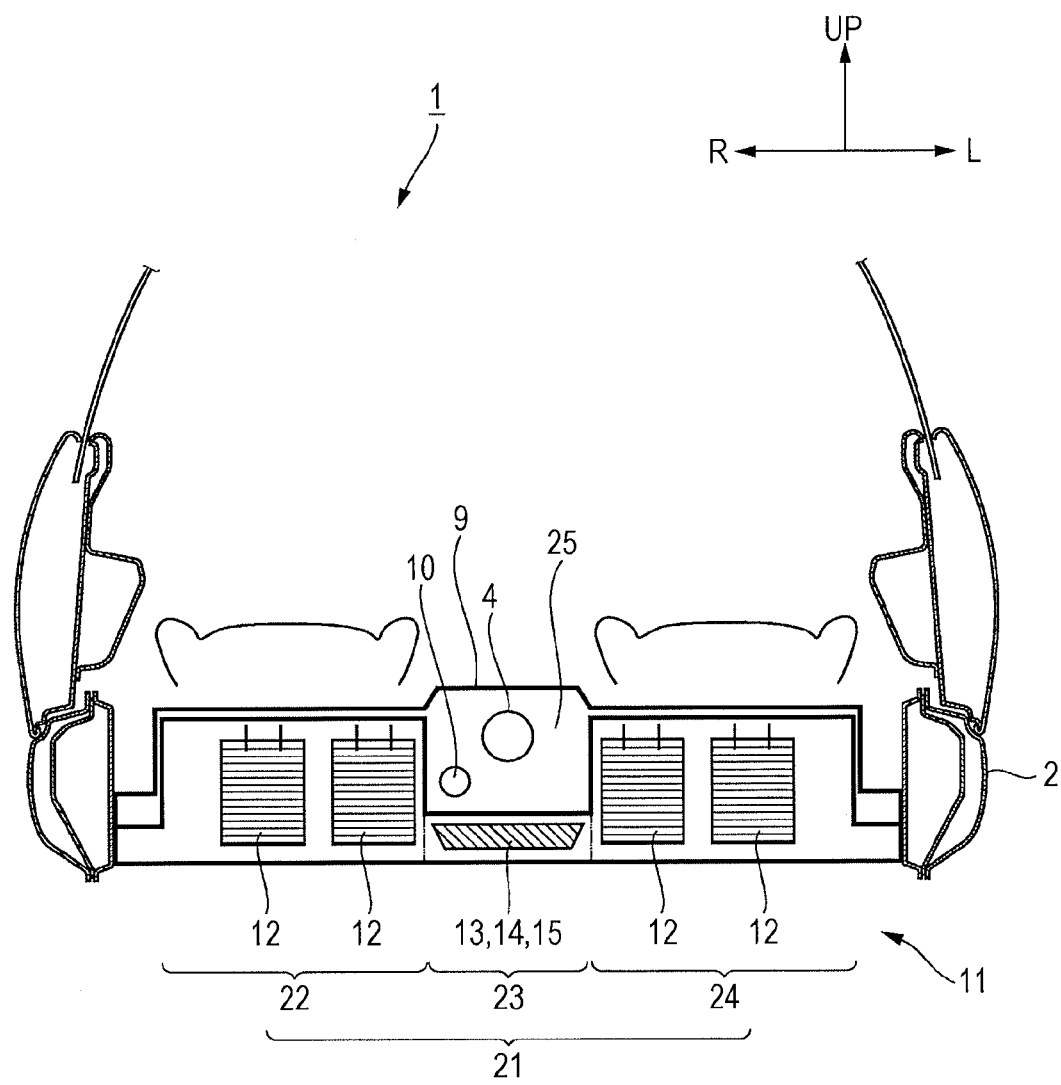
FIG. 3 is a schematic end view of the hybrid vehicle taken along a line III-III in FIG. 2.

FIG. 1 is a schematic side view of a hybrid vehicle 1 having a battery unit 11 according to an embodiment of the present invention. FIG. 2 is a top view illustrating a structure for mounting the battery unit 11 of the hybrid vehicle 1 of FIG. 1. FIG. 2 is a view, from above, of the battery unit 11 under the floor. FIG. 3 is a schematic end view of the hybrid vehicle 1 taken along the line III-III in FIG. 2. The hybrid vehicle 1 in FIGS. 1 to 3 has a box-shaped vehicle body 2.

An engine 3 is disposed at the front of the vehicle body 2. The hybrid vehicle 1 of FIG. 1 is a vehicle with an AWD or FR drive system, and is capable of driving front wheels 7 and rear wheels 5 by the driving force of an engine 3 or a drive motor 8. The driving force of the engine 3 mounted at the front of the vehicle body 2 is transmitted to the rear wheels 5 via a propeller shaft 4 connected to the engine 3, the rear wheels 5 being disposed at the rear of the vehicle body 2. For example, in the case of the AWD drive system, the engine 3 and the propeller shaft 4 are connected to each other via an electromagnetic clutch (not illustrated) and a transmission 6. In the hybrid vehicle 1 of FIG. 1, the electromagnetic clutch is disposed as part of the transmission 6. The propeller shaft 4 and the rear wheels 5 are connected to each other via a rear differential gear. The transmission 6 may be a CVT (Continuously Variable Transmission) system or the like. In addition, the transmission 6 and the front wheels 7 are connected to each other via a front differential gear (not illustrated). The transmission may be another device such as a motor. Part of the driving force generated by the engine 3 is transmitted to the propeller shaft 4, and is used to drive the rear wheels 5. The remaining driving force is used to drive the front wheels 7 via the front differential gear. In the AWD drive system, a distribution ratio of the driving force between the rear differential gear and the front differential gear is changed according to grip conditions or the like of the front wheels 7 and the rear wheels 5. An appropriate driving force is distributed to the four wheels.

The hybrid vehicle 1 of FIG. 1 has the integrated battery unit 11. The battery unit 11 stores electric power to be used for an operation such as driving the vehicle. As illustrated in FIG. 3, the battery unit 11 includes battery modules 12, a BCU (Battery Control Unit) 13, a distribution cable 14, and a junction box 15. The battery modules 12 use, for example, lithium ion batteries. In an electric vehicle or the hybrid vehicle 1, desired voltage and current are obtained by connecting a plurality of battery cells in series and/or parallel. Each of the battery modules 12 is a module housing a plurality of battery cells. BCU 13 manages and controls the battery modules 12. The BCU 13 measures, for example, the voltage, current, and temperature of each battery module 12 to recognize the state of the battery module 12. In addition, the BCU 13 monitors input of power from the battery modules 12 to the drive motor 8. In the present embodiment, one piece of the BCU 13 is disposed for two battery modules 12 on each of the right and left sides. The distribution cable 14 electrically connects the battery modules 12. The distribution cable 14 is connected with the junction box 15. The junction box 15 couples, branches, and relays the distribution cable 14.

The drive motor 8 of the hybrid vehicle 1 is driven by the power supplied from the battery modules 12 of the battery unit 11. Part of the driving force of the drive motor 8 is transmitted to the propeller shaft 4 via the engine 3 or the transmission 6, and is used to drive the rear wheels 5. The remaining driving force is used to drive the front wheels 7 via the front differential gear.

The battery unit 11 has a housing 21. As illustrated in FIGS. 2 and 3, the housing 21 is installed under a floor panel 9 (under the floor of the vehicle body 2) between the front wheels 7 and the rear wheels 5 of the hybrid vehicle 1. The housing 21 has a left section 22, a central section 23, and a right section 24. The battery modules 12 are disposed in a pair of side sections, i.e., the left section 22 and the right section 24. The central section 23 connects the left section 22 and the right section 24. In the central section 23, the battery unit 11 is assembled from the BCU 13, the distribution cable 14, the junction box 15, and the like. A service plug may be disposed at the front of the central section 23. The battery unit 11 is detachably mounted underneath the floor panel 9 (the floor of the vehicle body 2). The battery unit 11 is mounted to the vehicle body 2 in such a manner that the central section 23 matches the center of the vehicle body 2, and the side sections 22 and 24 respectively match both sides of the vehicle body 2. Because the pair of the side sections 22 and 24 is exposed under the floor of the vehicle body 2, the battery modules 12 are cooled by the air flowing under the housing 21 of the battery unit 11. The battery modules 12 may be provided with a fan which takes air into the housing 21.

Figure 4:
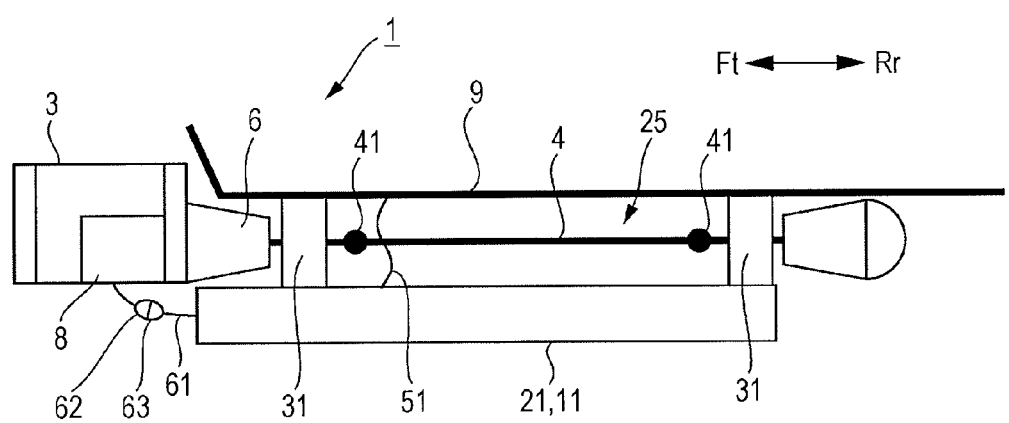
FIG. 4 is a diagram illustrating the manner (retaining condition) in which the battery unit in FIG. 1 is mounted to the vehicle body.
Figure 5:
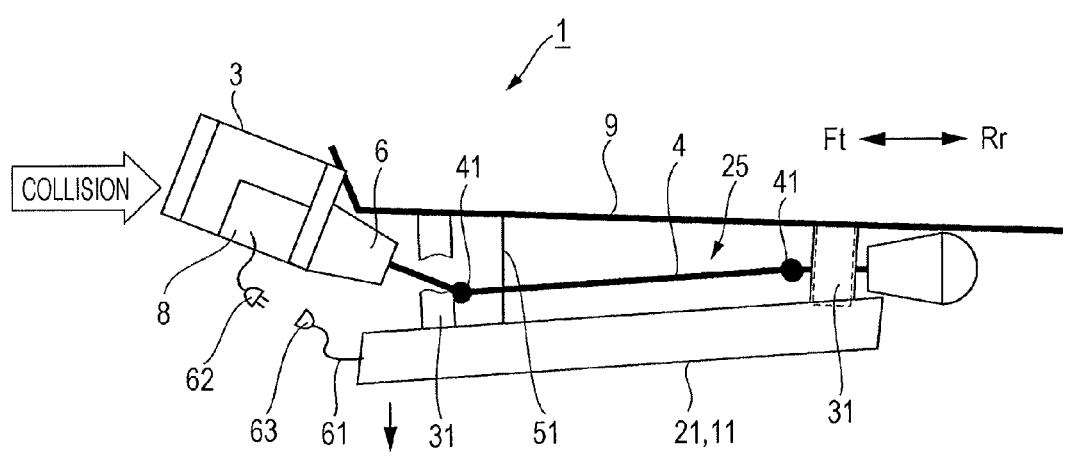
FIG. 5 is a diagram illustrating the manner in which the battery unit in FIG. 1 is partially detached from the vehicle body.

Next, the structure for mounting the battery unit 11 to the vehicle will be described in detail. FIG. 4 is a diagram illustrating the manner (retaining condition) in which the battery unit 11 in FIG. 1 is mounted to the vehicle body 2. FIG. 5 is a diagram illustrating the manner in which the battery unit 11 in FIG. 1 is partially detached from the vehicle body 2.

As illustrated in FIG. 4, the battery unit 11 is detachably connected to the floor panel 9 of the vehicle body 2 with a plurality of mounting members 31. The mounting members 31 project downward from the undersurface of the floor panel 9. As illustrated in FIG. 2, in the present embodiment, four mounting members 31 are disposed in two rows and disposed at front and rear positions in each row. The mounting members 31 should be strong enough to, at least, prevent the battery unit 11 from being detached from the vehicle body 2 in a normal use. The housing 21 is, for example, screwed at the end of each of the mounting members 31. The front mounting members 31 should be thinner and slightly less strong than the rear mounting members 31. Consequently, in the case where a force is applied to the housing 21 of the battery unit 11 from above, it is more likely that the front mounting members 31 rather than the rear mounting members 31 are broken first. Instead of having the front mounting members 31 and the rear mounting members 31 have different strengths, screw holes for connecting the front mounting members 31 and the housing 21 may be each formed as an oblong hole or a hook slot rather than a round hole. Consequently, in the case where a force is applied to the housing 21 of the battery unit 11 from above, it is more likely that the screw holes at the front are broken first and the housing 21 is partially detached from the front positions. Even in the case where the height of the mounting members 31 cannot be provided, the connection at the front positions rather than the connection at the rear positions is broken first and released by using screw holes of different shapes for the front and rear positions.

As illustrated in FIG. 3, the central section 23 of the housing 21 has a substantially flat plate shape, and connects the pair of the side sections 22 and 24 at lower edges. Accordingly, a recess 25 is formed in the middle of the upper surface of the housing 21 in the front-rear direction. The recess 25 is formed from the front edge to the rear edge of the housing 21. A center tunnel is formed between the floor panel 9 and the central section 23 of the housing 21 by mounting the battery unit 11 underneath the floor panel 9. The center tunnel communicates with an engine compartment at the front of the vehicle body 2, and the rear end of the center tunnel is open. The propeller shaft 4 and an exhaust pipe 10 of the engine 3 are disposed in the center tunnel. The battery unit 11 also serves as a receiver to receive the propeller shaft 4 which has been partially detached. The battery unit 11 prevents the partially detached propeller shaft 4 from colliding with a road surface. Heat insulating material may be disposed in the surrounding portion of the center tunnel in the housing 21 of the battery unit 11 in order to prevent the battery modules 12 from being heated by the exhaust heat of the engine 3, which flows from the engine compartment into the center tunnel.

As illustrated in FIG. 3, the central section 23 of the housing 21 connects the pair of the side sections 22 and 24 at lower edges. Accordingly, the undersurface of the housing 21 has a planar structure. Air flows smoothly under the vehicle body 2. Thus, the air resistance of the vehicle body 2 is reduced.

As illustrated in FIG. 4, the propeller shaft 4 has two couplings 41 that bendably couple adjacent segments of the propeller shaft 4. By providing the propeller shaft 4 with such couplings 41 or bearing, the propeller shaft 4 can be rotated even when the center rotation axis of the propeller shaft 4 at the front and the center rotation axis of the propeller shaft 4 at the rear are not collinear. In the present embodiment, the front coupling 41 is located rearward of the front mounting member 31 as illustrated in FIG. 2. The rear coupling 41 is located forward of the rear mounting members 31. By adopting such a relative disposition of the couplings 41 and the mounting members 31, the propeller shaft 4 which is bent at, for example, the front coupling 41 due to a backward push to the engine 3 collides with the housing 21 of the battery unit 11 at the front coupling 41. In addition, the front coupling 41 collides with the housing 21 at a position near and rearward of the front mounting members 31. As illustrated in FIG. 5, downward pressing force of the front coupling 41 can cause the battery unit 11 to be detached from the front position.

As illustrated in FIG. 4, the housing 21 of the battery unit 11 and the floor panel 9 are connected to each other via two wires 51. The wires 51 connect, for example, the front upper surface of the housing 21 and the rear surface of the floor panel 9. The wires 51 has a length slightly longer than the distance between the floor panel 9 and the housing 21 in a mounted position. The connection between the floor panel 9 and the housing 21 via the wires 51 with the above-mentioned length allows the housing 21 detached, for example, from the front position to be suspended from the wires 51 as illustrated in FIG. 5, thereby preventing the housing 21 from colliding with a road surface.

As illustrated in FIGS. 4 and 2, the battery unit 11 and the vehicle body 2 are connected to each other via a power cable 61. The battery unit 11 is connected via the power cable 61 to the power supply system of the vehicle body 2 such as the drive motor 8 and an alternator. The power cable 61 has a detachable plug 62 and a receptacle 63. Accordingly, in the case where the battery unit 11 is detached from the front position, the plug 62 is removed from the receptacle 63, and thus the power cable 61 is disconnected. The battery unit 11 which has been detached from the front position is electrically separated from the power supply system of the vehicle body 2. As a result, the power of the battery unit 11 is not supplied to the drive motor 8 and the alternator.

As described above, the battery unit 11 of the present embodiment is disposed below the propeller shaft 4 under the floor panel 9 of the hybrid vehicle 1, so that the battery unit 11 can be detached from the vehicle body 2 in the case where the propeller shaft 4 is pushed down. Thus, in the case, for example, where the engine 3 is pushed back in a vehicle collision and the propeller shaft 4 is bent and pushed down, the battery unit 11 is partially detached from the vehicle body 2. Because the battery unit 11 is partially detached, the magnitude of the bend angle of the propeller shaft 4 is not limited by the presence of the battery unit 11, thereby reducing the adverse effect to the impact absorption performance caused by the arrangement of the battery unit 11 under the floor panel 9. Without impairing the impact absorption performance of the hybrid vehicle 1 having the propeller shaft 4, which is achieved by backward movement of the engine 3, the battery unit 11 can be disposed underneath the floor panel 9 of the vehicle body 2 having the propeller shaft 4, while maintaining or ensuring safety against collision.

In the present embodiment, the propeller shaft 4 is housed in the center tunnel which is enclosed by the pair of the side sections 22 and 24, the central section 23 of the housing 21 of the battery unit 11, and the floor panel 9 of the vehicle body 2. Therefore, even if the propeller shaft 4 is partially detached or bent due to a collision, the propeller shaft 4 is held in the center tunnel, thereby preventing the propeller shaft 4 from colliding with a road surface. Because the battery modules 12 are housed in the pair of the side sections 22 and 24 of the housing 21, the temperature of the battery modules 12 is not likely to increase even if the heat of the engine 3 flows into the center tunnel.

In the present embodiment, in the case where the propeller shaft 4 is bent and pushed down, the propeller shaft 4 collides with the housing 21 of the battery unit 11. The housing 21 is pushed down by the bent propeller shaft 4, and thus the battery unit 11 is partially detached from the vehicle body 2. In this manner, the housing 21 of the battery unit 11 can be partially detached from the vehicle body 2 by utilizing downward pressing force of the propeller shaft 4 which has been pushed down. Controlling the battery unit 11 so as to be partially detached is unnecessary. Additionally, when the propeller shaft 4 is bent and the battery unit 11 needs to be partially detached, the battery unit 11 can be partially detached without fail. In particular, because the housing 21 of the battery unit 11 is formed in a depressed shape so as to enclose both sides and the lower side of the propeller shaft 4, the bent propeller shaft 4 collides with the housing 21 of the battery unit 11 without fail, thereby allowing a downward pressing force to act on the housing 21. The battery unit 11 can be partially detached by utilizing part of the impact absorption capability due to backward push to the engine 3. An increase in the impact absorption capability due to detachment of the battery unit 11 can be expected. Comprehensive impact absorption capability can be improved.

In the present embodiment, the battery unit 11 is partially detached by releasing the connection at the front position first, the battery unit 11 being connected to the floor of the vehicle body 2 at the front and rear positions. By releasing the connection at the front position first, the entire battery unit 11 is not likely to be detached from the vehicle. Particularly, in the present embodiment, the wires 51 keep the housing 21 off a road surface, the housing 21 being detached from the front position. Thus, the entire housing 21 of the partially detached battery unit 11 is kept off the road surface. The partially detached battery unit 11 is not likely to come into contact with the road surface, thereby preventing the detached battery unit 11 from being damaged.

In the present embodiment, the power cable 61 which connects the battery unit 11 and the vehicle body 2 has the detachable plug 62 and receptacle 63. With the battery unit 11 being detached, the detached battery unit 11 is electrically separated from the vehicle body 2. Consequently, no power is supplied from the detached battery unit 11 to the vehicle body 2 after a collision.

In the present embodiment, the propeller shaft 4 has the coupling 41 at a location (position) rearward of the front mounting member 31, and the propeller shaft 4 is bent at the coupling 41 when the engine 3 is pushed back. Consequently, by utilizing the force applied when the engine 3 at the front of the vehicle body 2 is pushed back and the propeller shaft 4 is bent at the coupling 41, the housing 21 can be pushed down and the battery unit 11 can be detached at the front position. When the battery unit 11 really needs to be partially detached, the battery unit 11 can be detached at the front position by utilizing the force applied when the propeller shaft 4 is bent. In particular, the coupling 41 at which the propeller shaft 4 is bent is disposed at a location rearward of the front mounting member 31. The propeller shaft 4 is bent at the coupling 41 with the rear end being the fulcrum. The force applied when the propeller shaft 4 is bent acts on the battery unit 11 rearward of the front mounting member 31. Consequently, the force applied when the propeller shaft 4 is bent is amplified by the principle of the lever, and acts on the front mounting member 31. The force acting on the front mounting member 31 can be amplified. The force applied when the propeller shaft 4 is bent can effectively act on the housing 21 so as to be partially detached. Consequently, strength of mounting the battery unit 11 with the mounting members 31 is increased, so that the battery unit 11 is prevented from being detached in a normal use, while retention by the mounting members 31 can be easily released and the battery unit 11 is partially detached when needed.

The above embodiment is an example of a preferred embodiment of the present invention, and, the present invention is not limited to the above embodiment, and various modifications and changes can be made in a range not departing from the spirit of the invention.

For example, in the above-described embodiment, the battery unit 11 is mounted underneath the floor of the hybrid vehicle 1. Besides that, for example, the battery unit 11 may be mounted underneath the floor of another vehicle such as a bus or a train. The propeller shaft 4 is connected to the engine 3 at the front in the above-described embodiment. Besides that, the propeller shaft 4 may be connected to the engine 3 at the rear of the vehicle. In addition, the propeller shaft 4 may be provided with bendable bearings instead of the couplings 41.

What is claimed is:

1. A hybrid vehicle comprising:
a propeller shaft to transmit a driving force in a front-rear direction of the vehicle body; and
a battery unit disposed below the propeller shaft under a floor of the vehicle body and configured to be detachable from the vehicle body when the propeller shaft is pushed down, wherein
the battery unit includes a housing having a pair of side sections disposed to the left and right of the propeller shaft under the floor of the vehicle body and configured to house a battery, and a central section configured to connect the pair of side sections below the propeller shaft, and
the propeller shaft is housed in a space enclosed by the pair of side sections and the central section of the housing, and the floor of the vehicle body.

2. The hybrid vehicle according to claim 1, wherein
the battery unit is detachably mounted to the floor of the vehicle body, so that the battery unit is configured to at least partially detach from the vehicle body by the housing being pushed down by the propeller shaft being pushed down.

3. A hybrid vehicle comprising:
a propeller shaft to transmit a driving force in a front-rear direction of the vehicle body; and
a battery unit disposed below the propeller shaft under a floor of the vehicle body and configured to be detachable from the vehicle body when the propeller shaft is pushed down, wherein
the battery unit includes a housing having a pair of side sections disposed to the left and right of the propeller shaft under the floor of the vehicle body and configured to house a battery, and a central section configured to connect the pair of side sections below the propeller shaft,
the propeller shaft is housed in a space enclosed by the pair of side sections and the central section of the housing, and the floor of the vehicle body,
the battery unit is detachably mounted to the floor of the vehicle body, so that the battery unit is configured to at least partially detach from the vehicle body by the housing being pushed down by the propeller shaft being pushed down, and
the battery unit is mounted to the floor of the vehicle body by a plurality of mounting members arranged at front and rear positions of the vehicle body, and the connection between the battery unit and the vehicle body via at least one front mounting member is configured to release by the housing being pushed down by the propeller shaft being pushed down.

4. The hybrid vehicle according to claim 3, further comprising:
a retaining member configured to connect the housing of the battery unit to the vehicle body,
wherein the retaining member is configured to retain the housing after a detachment of the housing at the front position due to the release of the connection between the battery unit and the vehicle body via the at least one front mounting member.

5. The hybrid vehicle according to claim 3, further comprising
a power cable connecting the battery unit to the vehicle body and configured to electrically separate the battery unit from the vehicle body by a detachable plug and receptacle structure.

6. The hybrid vehicle according to claim 5, wherein
the detachable plug and receptacle structure is configured to electrically separate the battery unit from the vehicle body after a detachment of the battery unit from the vehicle body.

7. The hybrid vehicle according to claim 3, wherein
the propeller shaft is connected to an engine disposed at a front position of the vehicle body and has a coupling or a bearing at a location rearward of the front mounting members,
the coupling or bearing is configured such that, when the engine is pushed back, the propeller shaft is bent at the coupling or the bearing, and the housing is pushed down, thereby causing the battery unit to detach at the front location.

* * * * *